Patented June 16, 1942

2,286,505

UNITED STATES PATENT OFFICE 2,286,505

POLYMERIZED CHLOROPRENE ADHESIVE

John L. Perkins, Arlington, Mass., assignor to B. B. Chemical Co., Boston, Mass., a corporation of Massachusetts No Drawing. Application March 4, 1940, Serial No. 322,171

2 Claims. (Cl. 260—17)

This invention relates to polymerized chloroprene, and more particularly to liquid adhesive compositions prepared from plastic polymers of chloroprene.

Plastic polymerized chloroprene is chloroprene (also known as chloro-2-butadiene-1,3) which has been polymerized to such an extent that it may be worked on the rolls of a rubber mill and compounded with other ingredients in a manner similar to that in which crude rubber is treated. Such plastic polymerized chloroprene may be "cured" to a condition in which it resembles vulcanized rubber in exhibiting essentially elastic rather than plastic properties. This "curing" of plastic polymerized chloroprene, often spoken of as "vulcanization," appears to be a further polymerization of the chloroprene as distinguished from the vulcanization of rubber wherein sulphur is considered to be added to the molecule of the rubber hydrocarbon.

An object of this invention is to provide improved liquid adhesive compositions embodying plastic polymerized chloroprene. Other objects are to provide such liquid compositions of improved "body" at moderate concentrations of polymerized chloroprene and which will produce adhesive bonds of improved characteristics.

According to the present invention the above and other objects are attained by incorporating a relatively small percentage of ethyl cellulose in a liquid adhesive comprising a dispersion or colloidal solution of plastic polymerized chloroprene.

Liquid adhesives comprising polymerized chloroprene together with ethyl cellulose exhibit a number of advantageous characteristics. Thus liquid adhesive compositions containing a relatively low concentration of polymerized chloroprene, for example, in the neighborhood of 1 pound of polymerized chloroprene to a gallon of solution, have a relatively low viscosity and plasticity and tend to flow very freely, and to penetrate readily into porous materials such as fabric or leather. By associating from about 1% to 10% of ethyl cellulose with the polymerized chloroprene the viscosity and plasticity of the resulting solution or dispersion is increased, or, in other words, the polymerized chloroprene solution is "bodied up" to an extent that the liquid adhesive is more readily handled and applied. Thus the liquid adhesive of this invention exhibits less "drooling" from an applying device, such as a nozzle, and yet may be smoothly applied to a surface. Furthermore, the adhesive tends not to penetrate to too great an extent into porous material to which it is applied. I have found, moreover, that the presence of the ethyl cellulose in the polymerized chloroprene adhesive favorably affects the character of the resulting adhesive bond, giving what appears on visual examination to be a tighter bond, as well as increasing the strength thereof.

The liquid polymerized chloroprene adhesive with which the ethyl cellulose is associated may contain compounding ingredients for the polymerized chloroprene, or in suitable instances such compounding ingredients may be omitted. The plastic polymerized chloroprene is preferably rendered malodorant-free as may be accomplished, for example, by the methods described in United States Letters Patent Nos. 2,067,854 and 2,107,796, granted on applications filed in the name of Alexander D. Macdonald. The plastic polymerized chloroprene may be present in the liquid adhesive composition in amount from about ½ to 2½ pounds to the gallon of solution. The polymerized chloroprene may be prepared in the manner described in United States Letters Patent No. 1,950,436, granted March 13, 1934, upon an application of Ira Williams. The chloroprene itself may be made in the manner described in United States Letters Patent No. 1,950,431, granted March 13, 1934, upon an application of W. H. Carothers and A. M. Collins.

Various organic solvents may be employed in the liquid adhesive composition. Thus I have found benzene, toluene, "Solvesso," trichloroethylene, ethyl acetate, butyl acetate and other solvents to be satisfactory for this purpose. The solvent may consist of one or more liquids and, when desired, diluents such as ether may be present. The liquid portion of the composition, including solvents and diluents, should be selected so as not to throw out of solution the polymerized chloroprene or the ethyl cellulose.

The ethyl cellulose itself may be of any suitable viscosity characteristic. Thus I have found the grade of ethyl cellulose known as "low viscosity" to provide improved results both as to bodying effect and increase in the adhesive bond. Ethyl cellulose of the "medium viscosity" or "high viscosity" grades likewise may be employed. Ethyl cellulose of a given grade may be employed separately or in admixture with another grade.

The quantity of ethyl cellulose preferably is from about 1% to 10% of the weight of the polymerized chloroprene present in the liquid adhesive composition. I have obtained highly advantageous results by the use of about 5% of ethyl cellulose based on the weight of the polymerized chloroprene.

The ethyl cellulose may be incorporated in the liquid adhesive composition in any suitable manner. Thus, the ethyl cellulose may be milled with the polymerized chloroprene on the rubber mill with or without compounding ingredients, and the milled material then dispersed in the solvent as may readily be accomplished in a Werner-Pfeiderer mixer. The ethyl cellulose may also be added by dissolving it in a portion of the solvent to be used, and then adding the solution to the polymerized chloroprene dispersion. Moreover, the ethyl cellulose in dry, comminuted form, may be introduced into a mixer containing the solvent and the dispersed or partially dispersed polymerized chloroprene.

A specific example of a composition in accordance with this invention is as follows:

Composition I

| | |
|---|---|
| Plastic polymerized chloroprene (deodorized as disclosed in Macdonald Patent 2,067,854) _____pounds__ | 1.25 |
| Magnesium oxide_____do____ | .063 |
| "Kadox" (zinc oxide)_____do____ | .063 |
| Ethyl cellulose—type B—low viscosity (from Hercules Powder Co.)_pounds__ | .063 |
| Benzene_____fluid ounces__ | 120 |
| Yield_____gallons__ | 1 |

The above composition was prepared by milling together the polymerized chloroprene, magnesium oxide and zinc oxide on a rubber mill for a period of about twenty minutes, which was sufficient thoroughly to associate the ingredients, and then dispersing the milled material together with the ethyl cellulose in the solvent in a suitable mixing device such as a Werner-Pfeiderer mixer.

In the above composition it will be noted that the amount of ethyl cellulose is 5% of the weight of the polymerized chloroprene and that the total of the polymerized chloroprene and ethyl cellulose is 1.31 pounds per gallon. The magnesium oxide and zinc oxide are compounding ingredients for the polymerized chloroprene. The magnesium oxide serves, at least in part, to neutralize any hydrochloric acid which may be set free in the polymerized chloroprene, and to prevent scorching when zinc oxide and polymerized chloroprene are milled together. The zinc oxide appears to assist in the curing or more complete polymerization of the plastic polymerized chloroprene.

To illustrate the efficacy of adhesive compositions according to this invention I carried out certain comparative tests. Thus, a liquid adhesive composition like that described in Composition I was prepared. For comparative purposes another composition was prepared as follows:

Composition II

| | |
|---|---|
| Plastic polymerized chloroprene (deodorized as disclosed in Macdonald Patent 2,067,854) _____pounds__ | 1.25 |
| Magnesium oxide_____do____ | .063 |
| "Kadox" (zinc oxide)_____do____ | .063 |
| Benzene_____fluid ounces__ | 120 |
| Yield_____gallons__ | 1 |

It will be noted that this composition differs from Composition I only in that the ethyl cellulose present in Composition I has been omitted.

A third composition was prepared as follows:

Composition III

| | |
|---|---|
| Plastic polymerized chloroprene (deodorized as disclosed in Macdonald Patent 2,067,854) _____pounds__ | 1.31 |
| Magnesium oxide_____do____ | .063 |
| "Kadox" (zinc oxide)_____do____ | .063 |
| Benzene_____fluid ounces__ | 120 |
| Yield_____gallons__ | 1 |

This composition contains no ethyl cellulose but it contains an amount of polymerized chloroprene greater than that present in either Composition I or Composition II and equal to the total of the polymerized chloroprene and ethyl cellulose content of Composition I, namely, 1.31 pounds.

The viscosities of the above compositions were each determined shortly after their preparation by ascertaining the number of seconds required for a steel ball of 9.5 mm. (⅜" diameter) and weighing from 3.45 to 3.55 grams to drop 50 cm. through a sample of the liquid maintained at 25° C. in a glass tube of 19 mm. inside diameter.

To determine the adhesive bond obtainable with the Compositions I, II, and III, strips of sole leather 1 inch wide were coated by brush with the compositions and permitted to dry for an hour. For each specimen two strips were placed in juxtaposition with the coated sides together and placed under an attaching pressure of about 100 pounds per square inch for ½ minute. Two days after the cementing operation the test specimens were pulled apart on a Scott tester to determine the strength of adhesive bond. Each strength test given below is the average of six tests.

| | Viscosity | Pull test |
|---|---|---|
| | Seconds | Pounds |
| Composition I | 19 | 25 |
| Composition II | 12½ | 19 |
| Composition III | 16 | 20 |

It will be noted that with the composition according to this invention, namely, Composition I, a strength of bond was obtained which was over 30% greater than that obtained with the composition of Composition II which contained no ethyl cellulose but which otherwise was identical with Composition I. It is further to be noted that the strength of bond obtained with the adhesive composition of Composition I was 25% greater than that obtained with Composition III which contained no ethyl cellulose but which contained an amount of polymerized chloroprene greater than that of Composition I and equal to the total polymerized chloroprene and ethyl cellulose in Composition I.

It will further be noted that the viscosity of the liquid adhesive composition according to Composition I is over 34% greater than the viscosity of the liquid composition prepared under Composition II which contains no ethyl cellulose. Moreover, the viscosity of Composition I is over 18% greater than that of Composition III which, while it contains no ethyl cellulose, contains a total of polymerized chloroprene equal to the total of the polymerized chloroprene and ethyl cellulose in Composition I.

Not only did the adhesive composition prepared under Composition I in accordance with this invention exhibit superior results with respect to strength of bond and exhibit substantially greater viscosity but the liquid composition of Composition I exhibited greater plasticity and improved flowing properties when applied to the surface of the leather to be joined.

Having described my invention, what I claim as new and desire to secure by Letters Patent of the United States is:

1. A liquid adhesive composition comprising a colloidal solution of plastic polymerized chloroprene in an organic solvent, said composition containing about ½ to 2½ pounds of polymerized chloroprene per gallon of solution, and ethyl cellulose in amount from about 1% to 10% by weight of the polymerized chloroprene.

2. A liquid adhesive composition comprising a colloidal solution of plastic polymerized chloroprene in an organic solvent, said composition containing in the neighborhood of 1 pound of polymerized chloroprene to a gallon of solution, and ethyl cellulose in amount about 5% by weight of the polymerized chloroprene.

JOHN L. PERKINS.